United States Patent
Kuriyama

(10) Patent No.: US 11,400,762 B2
(45) Date of Patent: Aug. 2, 2022

(54) PNEUMATIC TIRE

(71) Applicant: The Yokohama Rubber Co., LTD., Tokyo (JP)

(72) Inventor: Masatoshi Kuriyama, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 307 days.

(21) Appl. No.: 16/318,685

(22) PCT Filed: Jun. 30, 2017

(86) PCT No.: PCT/JP2017/024262
§ 371 (c)(1),
(2) Date: Jan. 17, 2019

(87) PCT Pub. No.: WO2018/016302
PCT Pub. Date: Jan. 25, 2018

(65) Prior Publication Data
US 2019/0283505 A1  Sep. 19, 2019

(30) Foreign Application Priority Data
Jul. 19, 2016  (JP) .............................. JP2016-141831

(51) Int. Cl.
*B60C 11/03* (2006.01)
*B60C 11/12* (2006.01)
(Continued)

(52) U.S. Cl.
CPC ............ *B60C 11/0316* (2013.01); *B60C 5/00* (2013.01); *B60C 11/00* (2013.01); *B60C 11/03* (2013.01);
(Continued)

(58) Field of Classification Search
CPC ....... B60C 11/0316; B60C 5/00; B60C 11/00; B60C 11/03; B60C 11/0309; B60C 11/12;
(Continued)

(56) References Cited

U.S. PATENT DOCUMENTS

2005/0247388 A1* 11/2005 Ohsawa ................ B60C 11/032
152/209.9
2013/0118663 A1* 5/2013 Kishizoe ............. B60C 11/1218
152/209.18
(Continued)

FOREIGN PATENT DOCUMENTS

CN  103182903  7/2013
CN  104097463  10/2014
(Continued)

OTHER PUBLICATIONS

International Search Report for International Application No. PCT/JP2017/024262 dated Oct. 3, 2017, 4 pages, Japan.

*Primary Examiner* — Matthew J Daniels
*Assistant Examiner* — Shibin Liang
(74) *Attorney, Agent, or Firm* — Thorpe North & Western

(57) ABSTRACT

A pneumatic tire includes: a center lug groove extending in a lateral direction in a center land portion, the center lug groove connecting to two main groves at both ends; an outer middle lug groove extending in the lateral direction in an outer middle land portion, the outer middle lug groove connecting to two main groves at both ends; and an inner middle lug groove extending in the lateral direction in an inner middle land portion, the inner middle lug groove including an end connecting to the main groove of the two main grooves located inward in the lateral direction and the other end terminating within the inner middle land portion; and the center lug groove and the outer middle lug groove each including a central region in a length direction includ- (Continued)

ing a sipe portion, the sipe portion including a sipe with a chamfered opening portion.

20 Claims, 14 Drawing Sheets

(51) Int. Cl.
  *B60C 11/13* (2006.01)
  *B60C 11/00* (2006.01)
  *B60C 5/00* (2006.01)
(52) U.S. Cl.
  CPC .......... *B60C 11/0309* (2013.01); *B60C 11/12* (2013.01); *B60C 11/1204* (2013.01); *B60C 11/13* (2013.01); *B60C 2011/0353* (2013.01); *B60C 2011/1213* (2013.01)
(58) Field of Classification Search
  CPC ................. B60C 11/1204; B60C 11/13; B60C 2011/0353; B60C 2011/1213; B60C 11/04; B60C 11/11
  See application file for complete search history.

(56) References Cited

U.S. PATENT DOCUMENTS

| 2013/0167995 | A1 | 7/2013 | Hada |
| 2013/0206298 | A1 | 8/2013 | Guillermou |
| 2014/0299244 | A1 | 10/2014 | Okabe |
| 2015/0151584 | A1* | 6/2015 | Koishikawa .......... B60C 11/125 152/209.18 |
| 2015/0273951 | A1 | 10/2015 | Yamakawa |
| 2016/0303919 | A1* | 10/2016 | Yamaoka ............ B60C 11/1307 |
| 2017/0253089 | A1 | 9/2017 | Hayashi |
| 2018/0207992 | A1 | 7/2018 | Kuriyama |
| 2018/0207993 | A1 | 7/2018 | Kuriyama |
| 2018/0215203 | A1 | 8/2018 | Kuriyama |

FOREIGN PATENT DOCUMENTS

| CN | 105172478 | | 12/2015 | |
| JP | H07-040712 | | 2/1995 | |
| JP | 2007223493 | * | 9/2007 | ............. B60C 11/12 |
| JP | 2013-537134 | | 9/2013 | |
| JP | 2014051287 A | * | 12/2013 | ............. B60C 11/12 |
| JP | 2014-051287 | | 3/2014 | |
| JP | 2015005194 A | * | 1/2015 | ............. B60C 11/12 |
| JP | 2016-049879 | | 4/2016 | |
| WO | WO 2012/032144 | | 3/2012 | |
| WO | WO 2014/030476 | | 2/2014 | |
| WO | WO 2014/136883 | | 9/2014 | |
| WO | WO 2016/031158 | | 3/2016 | |
| WO | WO 2017/018019 | | 2/2017 | |
| WO | WO 2017/018020 | | 2/2017 | |
| WO | WO 2017/018161 | | 2/2017 | |

* cited by examiner

| | | CONVENTIONAL EXAMPLE | COMPARATIVE EXAMPLE 1 | COMPARATIVE EXAMPLE 2 | EXAMPLE 1 |
|---|---|---|---|---|---|
| MAIN GROOVE SHAPE | | OSCILLATION SHAPE (CHANGING GROOVE WIDTH) | OSCILLATION SHAPE (CONSTANT GROOVE WIDTH) | OSCILLATION SHAPE (CONSTANT GROOVE WIDTH) | OSCILLATION SHAPE (CONSTANT GROOVE WIDTH) |
| CENTER LAND PORTION | LUG GROOVE | ONE END PORTION TERMINATES WITHIN LAND PORTION | BOTH ENDS COMMUNICATE WITH MAIN GROOVES | ONE END PORTION TERMINATES WITHIN LAND PORTION | BOTH ENDS COMMUNICATE WITH MAIN GROOVES |
| | CONFIGURATION OF LUG GROOVE | ONLY GROOVE PORTION | ONLY SIPE PORTION | SIPE PORTION AND GROOVE PORTION | SIPE PORTION AND GROOVE PORTION |
| | SIPE | NO | ONE END PORTION TERMINATES WITHIN LAND PORTION | ONE END PORTION TERMINATES WITHIN LAND PORTION | ONE END PORTION TERMINATES WITHIN LAND PORTION |
| OUTER MIDDLE LAND PORTION | LUG GROOVE | ONE END PORTION TERMINATES WITHIN LAND PORTION | BOTH ENDS COMMUNICATE WITH MAIN GROOVES | ONE END PORTION TERMINATES WITHIN LAND PORTION | BOTH ENDS COMMUNICATE WITH MAIN GROOVES |
| | CONFIGURATION OF LUG GROOVE | ONLY GROOVE PORTION | ONLY SIPE PORTION | SIPE PORTION AND GROOVE PORTION | SIPE PORTION AND GROOVE PORTION |
| | SIPE | NO | ONE END PORTION TERMINATES WITHIN LAND PORTION | ONE END PORTION TERMINATES WITHIN LAND PORTION | ONE END PORTION TERMINATES WITHIN LAND PORTION |
| INNER MIDDLE LAND PORTION | LUG GROOVE | BOTH ENDS COMMUNICATE WITH MAIN GROOVES | ONE END PORTION TERMINATES WITHIN LAND PORTION | ONE END PORTION TERMINATES WITHIN LAND PORTION | ONE END PORTION TERMINATES WITHIN LAND PORTION |
| | COMMUNICATING SIPE | NO | YES | YES | YES |
| | CIRCUMFERENTIAL AUXILIARY GROOVE | NO | YES | YES | YES |
| SHOULDER LAND PORTION | LUG GROOVE | COMMUNICATES WITH MAIN GROOVE | ONE END PORTION TERMINATES WITHIN LAND PORTION | ONE END PORTION TERMINATES WITHIN LAND PORTION | ONE END PORTION TERMINATES WITHIN LAND PORTION |
| | CONFIGURATION OF LUG GROOVE | ONLY GROOVE PORTION | SIPE PORTION AND GROOVE PORTION | SIPE PORTION AND GROOVE PORTION | SIPE PORTION AND GROOVE PORTION |
| | SIPE | NO | YES | YES | YES |
| | COMMUNICATING SIPE | NO | YES | YES | YES |
| | RECESSED PORTION | NO | YES | YES | YES |
| DIFFERENCE IN GROOVE AREA RATIO BETWEEN TWO SIDES IN THE TIRE LATERAL DIRECTION (%) | | 5 | 2 | 2 | 2 |
| WEAR RESISTANCE PERFORMANCE | | 100 | 102 | 98 | 102 |
| WET BRAKING | | 100 | 98 | 102 | 102 |

FIG. 11A

|  |  | EXAMPLE 2 | EXAMPLE 3 | EXAMPLE 4 | EXAMPLE 5 |
|---|---|---|---|---|---|
| MAIN GROOVE SHAPE | | OSCILLATION SHAPE (CONSTANT GROOVE WIDTH) | OSCILLATION SHAPE (CHANGING GROOVE WIDTH) | OSCILLATION SHAPE (CONSTANT GROOVE WIDTH) | OSCILLATION SHAPE (CONSTANT GROOVE WIDTH) |
| CENTER LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| OUTER MIDDLE LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| INNER MIDDLE LAND PORTION | LUG GROOVE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| | COMMUNICATING SIPE | YES | YES | YES | YES |
| | CIRCUMFERENTIAL AUXILIARY GROOVE | NO | YES | YES | YES |
| SHOULDER LAND PORTION | LUG GROOVE | ONE END PORTION TERMINATES WITHIN LAND PORTION | ONE END PORTION TERMINATES WITHIN LAND PORTION | ONE END PORTION COMMUNICATES WITH MAIN GROOVE | ONE END PORTION TERMINATES WITHIN LAND PORTION |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | YES | YES | YES | YES |
| | COMMUNICATING SIPE | YES | YES | NO | NO |
| | RECESSED PORTION | YES | YES | YES | YES |
| DIFFERENCE IN GROOVE AREA RATIO BETWEEN TWO SIDES IN THE TIRE LATERAL DIRECTION (%) | | 2 | 2 | 2 | 2 |
| WEAR RESISTANCE PERFORMANCE | | 104 | 102 | 104 | 102 |
| WET BRAKING | | 100 | 100 | 102 | 102 |

FIG. 11B

|  |  | EXAMPLE 6 | EXAMPLE 7 | EXAMPLE 8 | EXAMPLE 9 |
|---|---|---|---|---|---|
| MAIN GROOVE SHAPE | | OSCILLATION SHAPE (CONSTANT GROOVE WIDTH) | OSCILLATION SHAPE (CONSTANT GROOVE WIDTH) | OSCILLATION SHAPE (CONSTANT GROOVE WIDTH) | OSCILLATION SHAPE (CONSTANT GROOVE WIDTH) |
| CENTER LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
|  | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
|  | SIPE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| OUTER MIDDLE LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
|  | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
|  | SIPE | ONE END PORTION TERMINATES WITHIN LAND PORTION | ONE END PORTION TERMINATES WITHIN LAND PORTION | ONE END PORTION TERMINATES WITHIN LAND PORTION | BOTH ENDS COMMUNICATE WITH MAIN GROOVES |
| INNER MIDDLE LAND PORTION | LUG GROOVE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
|  | COMMUNICATING SIPE | YES | YES | YES | YES |
|  | CIRCUMFERENTIAL AUXILIARY GROOVE | YES | YES | YES | YES |
| SHOULDER LAND PORTION | LUG GROOVE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
|  | CONFIGURATION OF LUG GROOVE | ONLY END PORTION | SIPE PORTION AND GROOVE PORTION | SIPE PORTION AND GROOVE PORTION | SIPE PORTION AND GROOVE PORTION |
|  | SIPE | YES | NO | YES | YES |
|  | COMMUNICATING SIPE | YES | YES | YES | YES |
|  | RECESSED PORTION | YES | YES | NO | YES |
| DIFFERENCE IN GROOVE AREA RATIO BETWEEN TWO SIDES IN THE TIRE LATERAL DIRECTION (%) | | 2 | 2 | 2 | 2 |
| WEAR RESISTANCE PERFORMANCE | | 102 | 104 | 106 | 104 |
| WET BRAKING | | 104 | 102 | 102 | 104 |

FIG. 11C

| | | EXAMPLE 10 | EXAMPLE 11 | EXAMPLE 12 | EXAMPLE 13 |
|---|---|---|---|---|---|
| MAIN GROOVE SHAPE | | OSCILLATION SHAPE (CONSTANT GROOVE WIDTH) | OSCILLATION SHAPE (CONSTANT GROOVE WIDTH) | OSCILLATION SHAPE (CONSTANT GROOVE WIDTH) | OSCILLATION SHAPE (CONSTANT GROOVE WIDTH) |
| CENTER LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | BOTH ENDS COMMUNICATE WITH MAIN GROOVES | ONE END PORTION TERMINATES WITHIN LAND PORTION | ONE END PORTION TERMINATES WITHIN LAND PORTION | ONE END PORTION TERMINATES WITHIN LAND PORTION |
| OUTER MIDDLE LAND PORTION | LUG GROOVE | BOTH ENDS COMMUNICATE WITH MAIN GROOVES | BOTH ENDS COMMUNICATE WITH MAIN GROOVES | BOTH ENDS COMMUNICATE WITH MAIN GROOVES | BOTH ENDS COMMUNICATE WITH MAIN GROOVES |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| INNER MIDDLE LAND PORTION | LUG GROOVE | ONE END PORTION TERMINATES WITHIN LAND PORTION | ONE END PORTION TERMINATES WITHIN LAND PORTION | ONE END PORTION TERMINATES WITHIN LAND PORTION | COMMUNICATES WITH CIRCUMFERENTIAL AUXILIARY GROOVE AND MAIN GROOVE |
| | COMMUNICATING SIPE | YES | YES | NO | YES |
| | CIRCUMFERENTIAL AUXILIARY GROOVE | YES | YES | YES | YES |
| SHOULDER LAND PORTION | LUG GROOVE | ONE END PORTION TERMINATES WITHIN LAND PORTION | ONE END PORTION TERMINATES WITHIN LAND PORTION | ONE END PORTION TERMINATES WITHIN LAND PORTION | ONE END PORTION TERMINATES WITHIN LAND PORTION |
| | CONFIGURATION OF LUG GROOVE | SIPE PORTION AND GROOVE PORTION | SIPE PORTION AND GROOVE PORTION | SIPE PORTION AND GROOVE PORTION | SIPE PORTION AND GROOVE PORTION |
| | SIPE | YES | YES | YES | YES |
| | COMMUNICATING SIPE | YES | YES | YES | YES |
| | RECESSED PORTION | YES | YES | YES | YES |
| DIFFERENCE IN GROOVE AREA RATIO BETWEEN TWO SIDES IN THE TIRE LATERAL DIRECTION (%) | | 2 | 5 | 2 | 2 |
| WEAR RESISTANCE PERFORMANCE | | 102 | 104 | 106 | 104 |
| WET BRAKING | | 106 | 104 | 102 | 106 |

FIG. 11D

PNEUMATIC TIRE

TECHNICAL FIELD

The present technology relates to a pneumatic tire.

BACKGROUND ART

In a pneumatic tire, grooves are formed in a tread surface to drain the water between the tread surface and the road surface in wet road driving conditions. However, the grooves in the tread surface may cause noise when the vehicle is traveling. A known pneumatic tire is designed to reduce such noise by modifying the shape of the grooves. For example, the pneumatic tire described in Japan Unexamined Patent Publication No. H07-004071 is designed to reduce noise while maintaining wet performance and includes a circumferential main groove extending in the tire circumferential direction provided with broad portions with a large groove width and narrow portions with a small groove width, wherein the broad portions and the narrow portions are disposed at a plurality of pitches in the tire circumferential direction around the tire circumference.

Additionally, a known pneumatic tire is designed to reduce the energy consumption when rolling in response to the energy loss generated by hysteresis loss when a pneumatic tire rolls. For example, the pneumatic tire described in Japan Unexamined Patent Publication No. 2013-537134 is designed to improve energy performance of the tire and includes, in a tread, a circumferential band in a central zone defined by two grooves extending in the tire circumferential direction and a plurality of lateral sipes disposed in the circumferential band uniformly in the circumferential direction, wherein the sipes divide the circumferential band into blocks, and the opening portions of the sipes are chamfered.

In a configuration such as that described in Japan Unexamined Patent Publication No. H07-004071 in which the groove width of the circumferential main groove is varied along the tire circumference, the rigidity of the land portion also varies along the tire circumference. This increases susceptibility to uneven wear. In a configuration such as that described in Japan Unexamined Patent Publication No. 2013-537134 in which the energy performance of the tire is improved, improvement in wear resistance performance is also likely. However, effectively improving wet performance is difficult. In this way, achieving uneven wear resistance performance and wet performance in a compatible manner has been very difficult.

SUMMARY

The present technology provides a pneumatic tire that can provide improved wear resistance performance while maintaining wet performance.

An embodiment of the present technology includes a pneumatic tire with a designated mounting direction with respect to a vehicle, the pneumatic tire including, a plurality of main grooves formed in a tread surface extending in a tire circumferential direction, a center land portion defined on both sides in a tire lateral direction by the main grooves, a middle land portion located on either side of the center land portion in the tire lateral direction, the middle land portion being defined by the main groove defining the center land portion and the main groove outwardly adjacent in the tire lateral direction to the main groove defining the center land portion, a center lug groove extending in the tire lateral direction formed in the center land portion, the center lug groove including ends on both sides connecting to two of the main grooves defining the center land portion, an outer middle lug groove extending in the tire lateral direction formed in an outer middle land portion, of the two middle land portions, located on a vehicle mounting direction outer side, the outer middle lug groove including ends on both sides connecting to two of the main grooves adjacent to the outer middle land portion, and an inner middle lug groove extending in the tire lateral direction formed in an inner middle land portion, of the two middle land portions, located on a vehicle mounting direction inner side, the inner middle lug groove including an end connecting to the main groove located inward in the tire lateral direction of the two main groves defining the inner middle land portion and the other end terminating within the inner middle land portion, wherein the center lug groove and the outer middle lug groove each includes a sipe portion at a central region in a length direction, the sipe portion includes a sipe with a chamfered opening portion, and the outer middle lug groove, the center lug groove, and the inner middle lug groove are disposed in a communicating manner.

In the pneumatic tire described above, preferably, the inner middle land portion includes a circumferential auxiliary groove extending in the tire circumferential direction, and the inner middle lug groove is disposed inward from the circumferential auxiliary groove in the tire lateral direction.

In the pneumatic tire described above, preferably, the main grooves are disposed four side by side in the tire lateral direction, and include shoulder land portions located outwardly adjacent to the middle land portions in the tire lateral direction interposing the main grooves, the four main grooves extending in the tire lateral direction with a constant groove width, oscillating in the tire lateral direction.

In the pneumatic tire described above, preferably, the shoulder land portions each include a shoulder lug groove extending in the tire lateral direction, and the shoulder lug groove includes an inner end portion in the tire lateral direction terminating within the shoulder land portion.

In the pneumatic tire described above, preferably, the shoulder land portions each include a communicating sipe, and the communicating sipe connects an inner end portion of the shoulder lug groove in the tire lateral direction and the main groove defining an inner end portion of the shoulder land portion in the tire lateral direction.

In the pneumatic tire described above, preferably, the shoulder lug groove includes a predetermined region, from an inner end portion in the tire lateral direction outward in the tire lateral direction, configured with a chamfered sipe with a chamfered opening portion.

In the pneumatic tire described above, preferably, the shoulder land portion includes a plurality of the shoulder lug grooves, and the plurality of shoulder lug grooves all include the chamfered sipe.

In the pneumatic tire described above, preferably, the shoulder land portion includes a shoulder sipe extending in the tire lateral direction and communicating with the main groove defining an inner end portion of the shoulder land portion in the tire lateral direction, and the shoulder lug groove and the shoulder sipe are alternately disposed in the tire circumferential direction.

In the pneumatic tire described above, preferably, the shoulder land portion includes a recessed portion at an outer end of the shoulder land portion in the tire lateral direction, and the shoulder sipe includes an outer end portion in the tire lateral direction terminating at the recessed portion.

In the pneumatic tire described above, preferably, the shoulder land portion includes a recessed portion at an outer end of the shoulder land portion in the tire lateral direction, the recessed portions being disposed in two rows in the tire lateral direction, a laterally inner row including two recessed portions are arranged in the tire circumferential direction, a laterally outer row including three recessed portions are arranged in the tire circumferential direction, and the laterally outer row has a larger diameter than the laterally inner row.

In the pneumatic tire described above, preferably, the middle land portion includes a middle sipe extending in the tire lateral direction, the center land portion includes a center sipe extending in the tire lateral direction, the middle sipe includes an end communicating with the main groove defining an inner end portion of the middle land portion on the vehicle mounting direction inner side and the other end terminating within the middle land portion, and the center sipe includes an end communicating with the main groove defining an inner end portion of the center land portion on the vehicle mounting direction inner side and the other end terminating within the center land portion.

In the pneumatic tire described above, preferably, the tread surface includes a tread pattern with an asymmetrical pattern in the tire lateral direction, and a difference in groove area ratio between two sides of a tire equatorial plane in the tire lateral direction is 2% or less.

A pneumatic tire according to an embodiment of the present technology achieves an effect of improving wear resistance performance while maintaining wet performance.

BRIEF DESCRIPTION OF DRAWINGS

FIG. 11A is a table showing the results of performance tests of pneumatic tires.

FIG. 11B is a table showing the results of performance tests of pneumatic tires.

FIG. 11C is a table showing the results of performance tests of pneumatic tires.

FIG. 11D is a table showing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire radial direction" refers to the direction orthogonal to the rotation axis of a pneumatic tire 1. "Inward in the tire radial direction" refers to the direction toward the rotation axis in the tire radial direction. "Outward in the tire radial direction" refers to the direction away from the axis of rotation in the tire radial direction. "Tire circumferential direction" refers to the circumferential direction with the rotation axis as the center axis. Additionally, "tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. "Tire equatorial plane CL" refers to the plane orthogonal to the rotation axis of the pneumatic tire 1 that passes through the center of the tire width of the pneumatic tire 1. "Tire width" is the width in the tire lateral direction between components located outward in the tire lateral direction, or in other words, the distance between the components that are the most distant from the tire equatorial plane CL in the tire lateral direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

Figure 1:
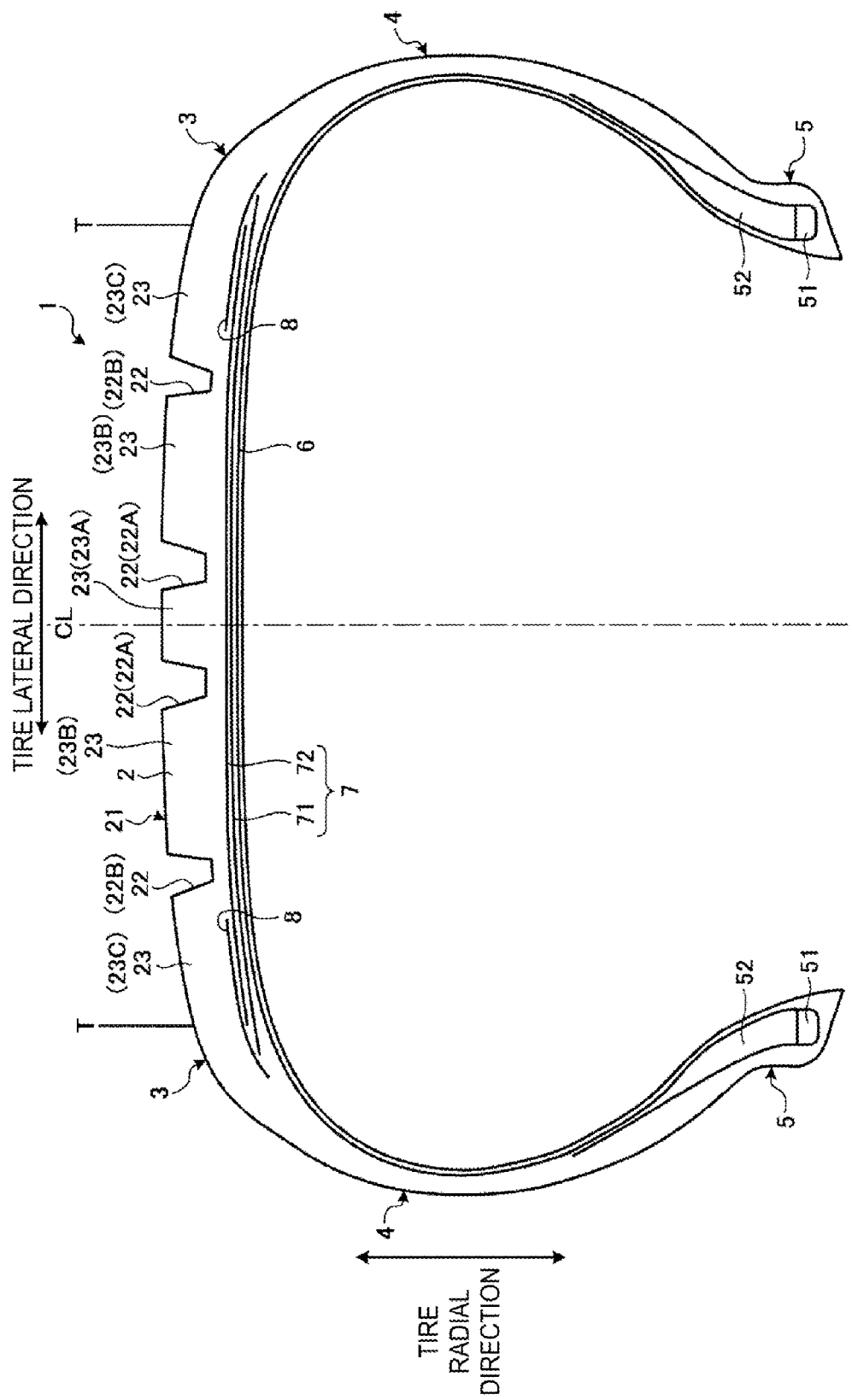
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. For the pneumatic tire 1 illustrated in FIG. 1, a mounting direction with respect to a vehicle, i.e., a direction for when mounted, is designated. In other words, for the pneumatic tire illustrated in FIG. 1, the side facing the inner side of the vehicle when the tire is mounted on a vehicle corresponds to a vehicle mounting direction inner side, and the side facing the outer side of the vehicle when the tire is mounted on a vehicle corresponds to a vehicle mounting direction outer side. Note that the designations of the vehicle mounting direction inner side and the vehicle mounting direction outer side are not limited to cases where the tire is mounted on a vehicle. For example, when the pneumatic tire 1 is mounted on a rim, the orientation of the rim is predetermined in relation to the inner side and the outer side of the vehicle in the tire lateral direction. Thus, in cases in which the pneumatic tire 1 is mounted on a rim, the orientation with respect to the vehicle mounting direction inner side and the vehicle mounting direction outer side in the tire lateral direction is designated. The pneumatic tire 1 includes a mounting direction indicator portion (not illustrated) that indicates the mounting direction with respect to a vehicle. The mounting direction indicator portion, for example, is constituted by a mark or grooves/ridges on a sidewall portion 4 of the tire. For example, Economic Commission for Europe Regulation 30 (ECE R30) requires that a mounting direction indicator portion is provided on the sidewall portion 4 on the vehicle mounting direction outer side when the tire is mounted on a vehicle. Additionally, the pneumatic tire 1 according to the present embodiment is used mainly on passenger vehicles.

The pneumatic tire 1 of the present embodiment includes a tread portion 2, shoulder portions 3 on opposite sides of the tread portion 2, and sidewall portions 4 and bead portions 5 continuing on from the shoulder portions 3 in that order. Additionally, the pneumatic tire 1 includes a carcass layer 6, a belt layer 7, and a belt reinforcing layer 8.

The tread portion 2 is made of a rubber material (tread rubber) and is exposed on the outermost side of the pneumatic tire 1 in the tire radial direction, with the outer circumferential surface thereof constituting the profile of the pneumatic tire 1. The outer circumferential surface of the tread portion 2 is configured as a tread surface 21 that comes into contact with the road surface when the tire is running.

The shoulder portions 3 are portions of the tread portion 2 located outward in the tire lateral direction on both sides. Additionally, the sidewall portions 4 are exposed on the outermost sides of the pneumatic tire 1 in the tire lateral direction. The bead portions 5 each include a bead core 51 and a bead filler 52. The bead core 51 is formed by winding a bead wire, which is a steel wire, into an annular shape. The bead filler 52 is a rubber material that is disposed in the space formed by an end of the carcass layer 6 in the tire lateral direction being folded back at the position of the bead core 51.

The end portions of the carcass layer 6 in the tire lateral direction are folded back around the pair of bead cores 51 from inward to outward in the tire lateral direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of organic fibers, such as polyester, rayon, and nylon. The carcass layer 6 is provided with at least one layer.

The belt layer 7 has a multilayer structure in which at least two belts 71, 72 are layered. In the tread portion 2, the belt layer 7 is disposed outward of the carcass layer 6 in the tire radial direction, i.e. on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (for example, from 20° to 30°). The cords are made of, for example, steel or organic fibers, such as polyester, rayon, and nylon. Moreover, the belts 71, 72 overlap each other and are disposed so that the direction of the cords of the respective belts intersect each other.

The belt reinforcing layer 8 is disposed outward of the belt layer 7 in the tire radial direction, i.e. on the outer circumference thereof, and covers the belt layer 7 in the tire circumferential direction. The belt reinforcing layer 8 is made of coating rubber-covered cords (not illustrated) disposed side by side in the tire lateral direction and substantially parallel to the tire circumferential direction. The cords are made of, for example, steel or organic fibers, such as polyester, rayon, nylon, and the like. The angle of the cords with respect to the tire circumferential direction ranges in ±5 degrees. The belt reinforcing layer 8 illustrated in FIG. 1 is disposed to cover the end portion of the belt layer 7 in the tire lateral direction. The configuration of the belt reinforcing layer 8 is not limited to that described above. Although not illustrated in the drawings, a configuration may be used in which the belt reinforcing layer 8 is disposed to cover the entire belt layer 7. Alternatively, for example, a configuration with two reinforcing layers may be used, in which the inner reinforcing layer in the tire radial direction is formed larger than the belt layer 7 in the tire lateral direction to cover the entire the belt layer 7, and the outer reinforcing layer in the tire radial direction is disposed to only cover the end portions of the belt layer 7 in the tire lateral direction. In another example, a configuration with two reinforcing layers may be used, in which both of the reinforcing layers are disposed to only cover the end portions of the belt layer 7 in the tire lateral direction. In other words, the belt reinforcing layer 8 overlaps with at least the end portion of the belt layer 7 in the tire lateral direction. Additionally, the belt reinforcing layer 8 is configured by winding a band-like strip material with a width of approximately 10 mm in the tire circumferential direction.

Figure 2:
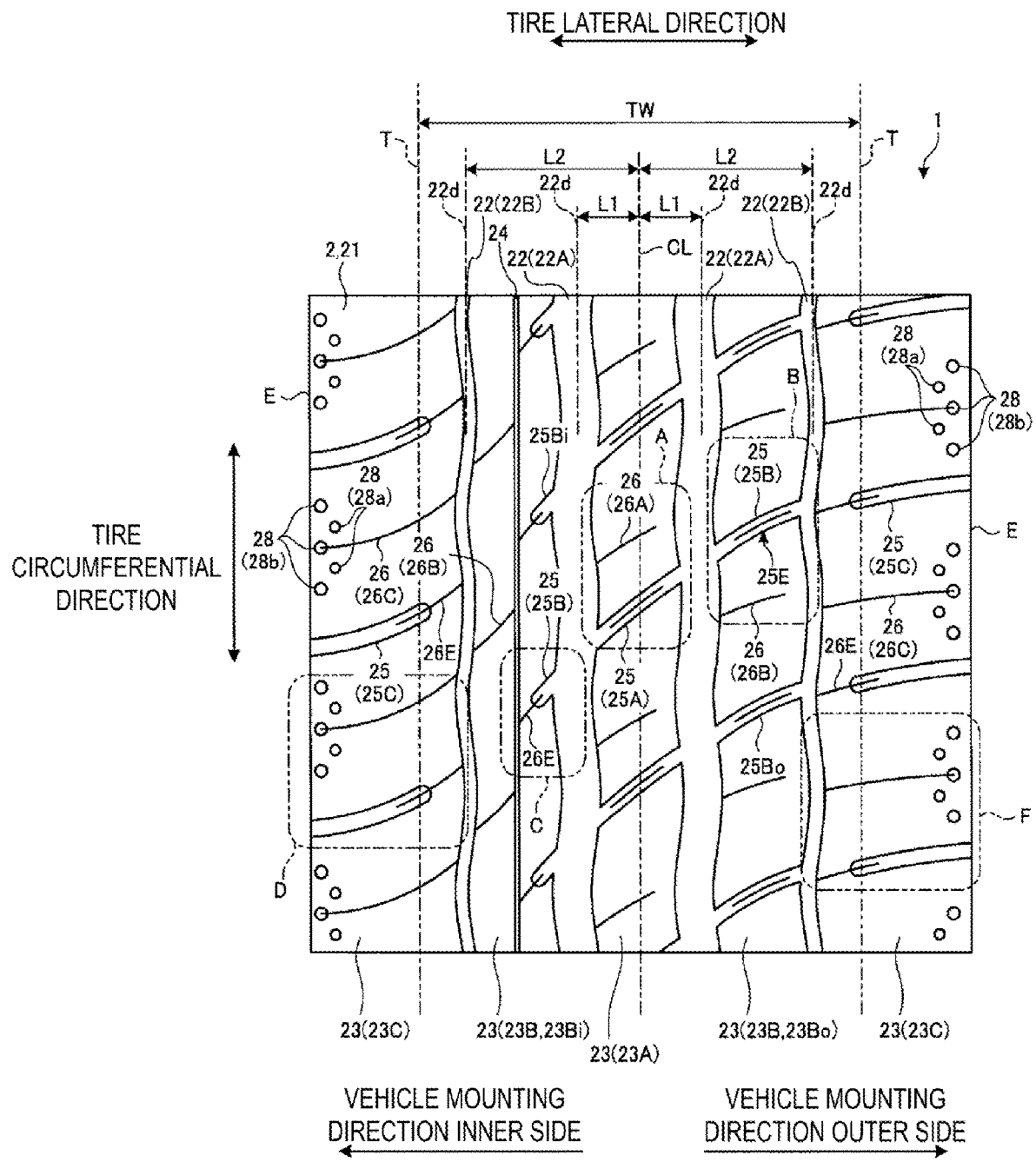
FIG. 2 is a plan view of a tread portion of the pneumatic tire illustrated in FIG. 1.

FIG. 2 is a plan view of the tread portion of the pneumatic tire illustrated in FIG. 1. Four main grooves 22 extending in the tire circumferential direction are formed side by side in the tire lateral direction in the tread surface 21 of the tread portion 2. The main grooves 22 include two center main grooves 22A disposed centrally in the tire lateral direction adjacent to one another on either side of the tire equatorial plane CL and each of the shoulder main grooves 22B disposed outward of the center main grooves 22A in the tire lateral direction.

Additionally, in the tread surface 21, five land portions 23 are defined by the four main grooves 22. The five land portions 23 include a center land portion 23A, two middle land portions 23B, and two shoulder land portions 23C. The center land portion 23A is disposed between the two center main grooves 22A on the tire equatorial plane CL and defined on both sides in the tire lateral direction by the two center main grooves 22A. The middle land portions 23B are defined by the center main grooves 22A and the shoulder main grooves 22B outwardly adjacent to the respective center main grooves 22A in the tire lateral direction and are disposed on either side of the center land portion 23A in the tire lateral direction. The shoulder land portions 23C are disposed outwardly adjacent to the middle land portions 23B in the tire lateral direction interposing the shoulder main grooves 22B therebetween and are disposed at the outermost portion of the tread portion 2.

Figure 3:
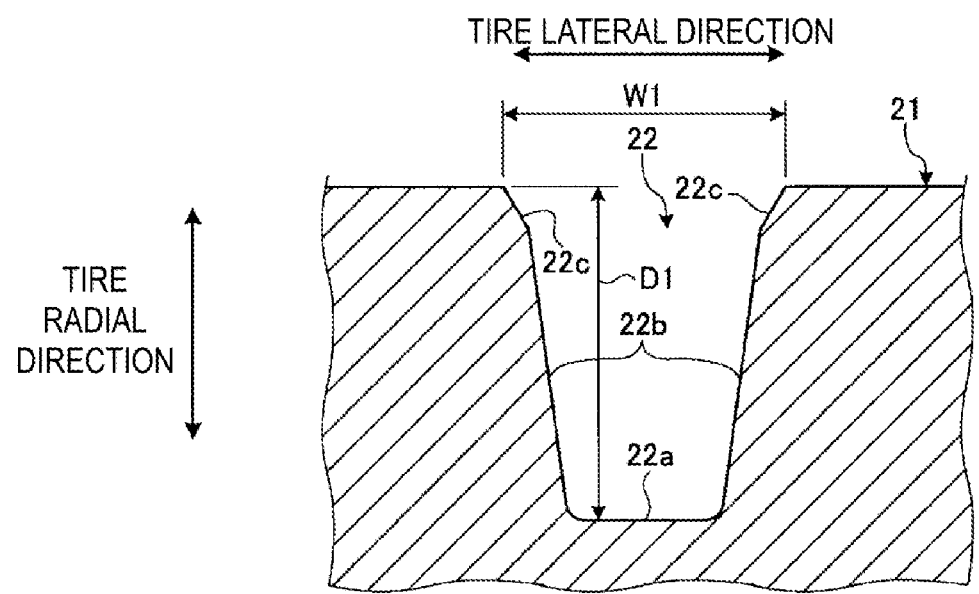
FIG. 3 is an enlarged cross-sectional view of a main groove illustrated in FIG. 2.

The four main grooves 22 extend in the tire circumferential direction with a constant groove width and are formed in a wave-like shape with an oscillation in the tire lateral direction. FIG. 3 is an enlarged cross-sectional view of a main groove illustrated in FIG. 2. The wave-like shape of each of the main groove 22 may be formed by a groove bottom 22a with a linear shape in the tire circumferential direction and groove walls 22b periodically oscillating in the tire circumferential direction with a groove width W1 maintaining constant. Note that the wave-like shape of each of the main groove 22 may also be formed by the groove bottom 22a and the groove walls 22b periodically oscillating in the tire circumferential direction with the groove width W1 remaining constant. Additionally, in the present embodiment, chamfers 22c are formed on the opening edges of each of the main grooves 22. The groove width W1 of the main grooves 22 is the width of the opening to the tread surface 21. For a main groove 22 formed with the chamfers 22c, the groove width W1 is the distance between the outer edges of the chamfers 22c. The oscillation position along the tire circumferential direction of the four main grooves 22 are substantially identical and the size of the oscillation is substantially identical. Accordingly, the center land portion 23A and the middle land portions 23B, which are the land portions 23 defined by the main grooves 22 on both sides in the tire lateral direction, extend in the tire circumferential direction oscillating in a wave-like manner in the tire lateral direction, with a constant width in the tire lateral direction.

Note that the groove width W1 of the center main grooves 22A ranges from 5 mm to 12 mm. A groove depth D1 of the center main grooves 22A ranges from 4 mm to 8 mm. The groove width W1 of the shoulder main grooves 22B is from 3 mm to 6 mm. The groove depth D1 of the shoulder main grooves 22B ranges from 4 mm to 8 mm. The groove width W1 of the center main grooves 22A is greater than the groove width W1 of the shoulder main grooves 22B. For example, the groove width W1 of the shoulder main grooves 22B preferably ranges from 10% to 50% of the groove width W1 of the center main grooves 22A. This maintains the drainage properties of the center main grooves 22A and ensures the rigidity of the land portions 23 around the shoulder main grooves 22B.

Additionally, as illustrated in FIG. 2, the central lines 22d of the oscillation of the center main grooves 22A are preferably located at a distance L1 outward in the tire lateral direction from the tire equatorial plane CL, the distance L1 ranging from 20% to 30% of a ground contact width TW. The central lines 22d of the oscillation of the shoulder main grooves 22B are preferably located at a distance L2 outward in the tire lateral direction from the tire equatorial plane CL, the distance L2 ranging from 60% to 70% of the ground contact width TW. This maintains the drainage properties of the center main grooves 22A and ensures the rigidity of the land portions 23 around the shoulder main grooves 22B. Furthermore, the edge shape in the tire lateral direction, the dimensions in the tire lateral direction, and the like of the land portions 23 are determined depending on the oscillation and position in the tire lateral direction of the main grooves 22.

"Ground contact width TW" refers to the width of the ground contact region in the tire lateral direction. Additionally, the outermost edges of the ground contact region in the tire lateral direction are referred to as ground contact edges T. In FIG. 2, the ground contact edges T are illustrated as being continuous in the tire circumferential direction. The ground contact region is the region where the tread surface 21 of the tread portion 2 of the pneumatic tire 1 comes into contact with a dry, flat road surface, when the pneumatic tire 1 is mounted on a regular rim, inflated to the regular internal pressure, and loaded with 70% of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

A circumferential auxiliary groove 24 extending in the tire circumferential direction is formed in an inner middle land portion 23Bi, one of the two middle land portions 23B located on the vehicle mounting direction inner side. The circumferential auxiliary groove 24 extends linearly along the tire circumferential direction with a groove width narrower than the smallest groove width W1 of the main grooves 22. The circumferential auxiliary groove 24 is centrally provided between the center main groove 22A and the shoulder main groove 22B that define the inner middle land portion 23Bi and divides the inner middle land portion 23Bi into rib land portions adjacent in the tire lateral direction. The circumferential auxiliary groove 24 has a groove width ranging from 1 mm to less than 3 mm and a groove depth ranging from 4 mm to 8 mm.

In the pneumatic tire 1 according to the present embodiment, the land portions 23 are provided with each of the plurality of lug grooves 25 and sipes 26 that extend in the tire lateral direction and are inclined or curved in the tire circumferential direction. The lug grooves 25 disposed in the center land portion 23A correspond to center lug grooves 25A. The lug grooves 25 disposed in the middle land portions 23B correspond to middle lug grooves 25B. The lug grooves 25 disposed in the shoulder land portions 23C correspond to shoulder lug grooves 25C. The sipes 26 disposed in the center land portion 23A correspond to center sipes 26A. The sipes 26 disposed in the middle land portions 23B correspond to middle sipes 26B. The sipes 26 disposed in the shoulder land portions 23C correspond to shoulder sipes 26C. Additionally, the sipes 26 that communicate with the terminating end of a lug groove 25 and reach a main groove 22 or a circumferential auxiliary groove 24 corresponds to communicating sipes 26E.

Here, sipe 26 refers to a narrow groove-like formation in the tread surface 21. The wall surfaces forming the narrow groove do not come into contact with one another when the pneumatic tire 1 is mounted on a regular rim, adjusted to the regular internal pressure conditions, and is in an unloaded state. Also, when the pneumatic tire 1 is placed on a flat plate and loaded in the vertical direction with the narrow groove located at the contact patch formed on the flat plate or when the land portion including the narrow groove flexes, the wall surfaces forming the narrow groove or at least a portion on the wall surfaces are brought into contact with one another by the deformation of the land portion. In the present embodiment, the sipes 26 have a width ranging from 0.4 mm to 0.8 mm.

Of the lug grooves 25 provided in the land portions 23, the center lug groove 25A is formed in the center land portion 23A and extends in the tire lateral direction. Both ends of the center lug groove 25A connect to the two center main grooves 22A that define the center land portion 23A. A plurality of center lug grooves 25A are arranged in the tire circumferential direction dividing the center land portion 23A into a row of block land portions in the tire circumferential direction.

Figure 4:
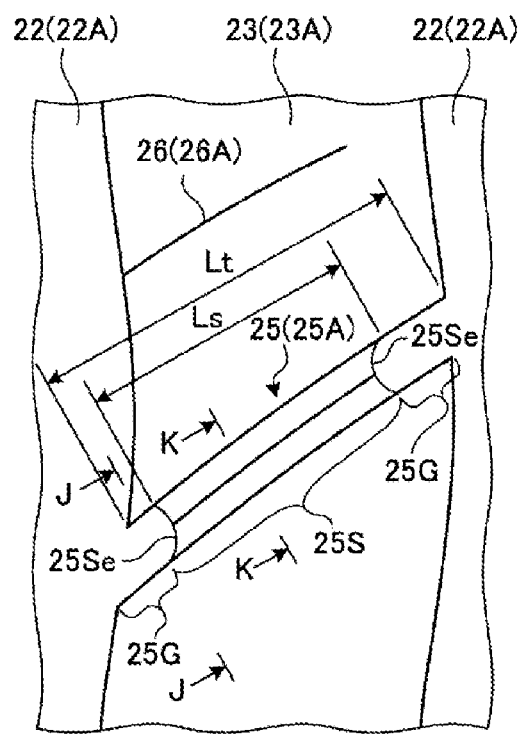
FIG. 4 is a detailed view of portion A of FIG. 2.
Figure 5:
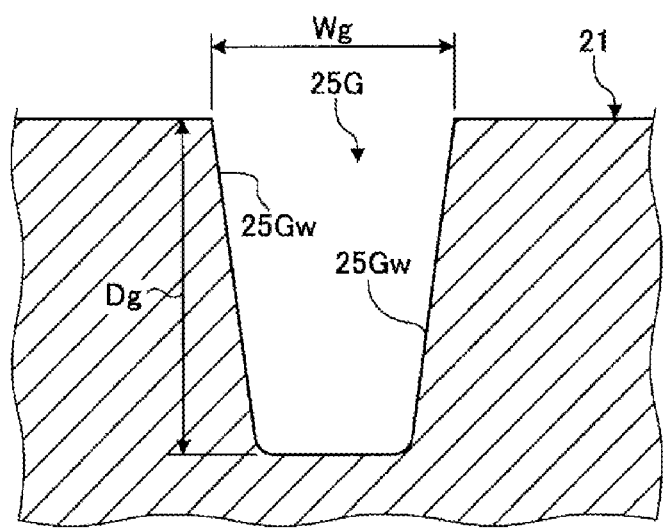
FIG. 5 is a cross-sectional view taken along J-J of FIG. 4.
Figure 6:
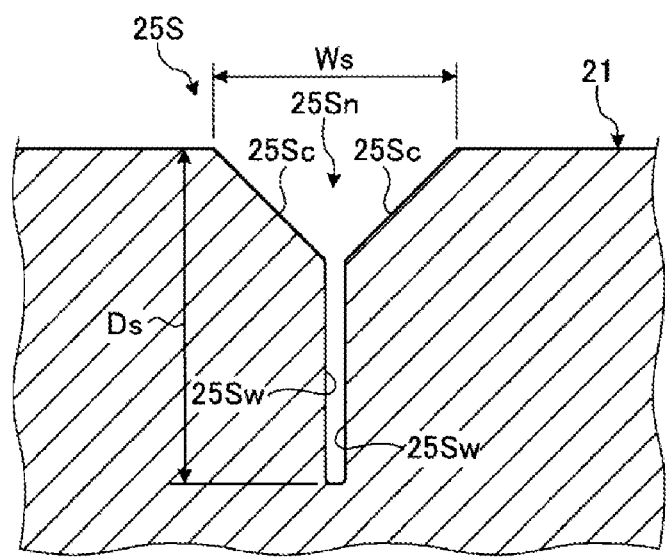
FIG. 6 is a cross-sectional view taken along K-K of FIG. 4.

FIG. 4 is a detailed view of portion A of FIG. 2. FIG. 5 is a cross-sectional view taken along J-J of FIG. 4. FIG. 6 is a cross-sectional view taken along K-K of FIG. 4. The center lug groove 25A includes a sipe portion 25S in a central region in the length direction of the center lug groove 25A. The sipe portion 25S includes a sipe with a chamfered opening portion. The center lug groove 25A also includes groove portions 25G on either side of the sipe portion 25S in the length direction of the center lug groove 25A. The groove portions 25G are grooves in which groove walls 25Gw remain separated from each other regardless of the contact state of the tread surface 21 around the center lug groove 25A. The sipe portion 25S includes a chamfered sipe 25Sn, which is a sipe including chamfers 25Sc on the opening portion side. The sipe portion 25S is formed with sipe walls 25Sw separated by an interval such that at least a portion of the sipe walls 25Sw are brought into contact with one another by deformation when the tread surface 21 around where the center lug groove 25A is formed comes into contact with the ground and the tread portion 2 deforms.

Additionally, the center lug groove 25A has substantially the same width as a groove width Wg of the groove portion 25G and a width Ws of the sipe portion 25S. In such a configuration, the groove width Wg of the groove portion 25G is the width of the opening portion of the groove portion 25G. Also, the width Ws of the sipe portion 25S is the interval between the intersection points of the chamfers 25Sc and the tread surface 21. Furthermore, the center lug groove 25A has substantially the same depth as a depth Dg of the groove portion 25G and a depth Ds of the sipe portion 25S. In such a configuration, the depth Dg of the groove portion 25G and the depth Ds of the sipe portion 25S are the depth from the tread surface 21 to the bottom portion of the groove portion 25G and the sipe portion 25S, respectively. The groove width Wg of the groove portions 25G and the width Ws of the sipe portion 25S range from 2 mm to 4 mm. The depth Dg of the groove portion 25G and the depth Ds of the sipe portion 25S range from 2 mm to 6 mm.

The chamfers 25Sc of the sipe portion 25S have an angle with respect to the depth direction of approximately 45° and are formed in a range of from ⅓ to ½ the depth Ds of the sipe portion 25S from the tread surface 21. The chamfers 25Sc may have the same angle for all of the lug grooves 25 or may have different angles for the lug grooves 25 depending on the ease of processing and the like in the manufacturing process.

The sipe portion 25S includes end portions 25Se at both ends in the length direction of the center lug groove 25A. The end portions 25Se are curved when viewed in a plan view. Specifically, the end portions 25Se of the sipe portion 25S are curved to project towards one another as the end portions 25Se extend from both ends in the width direction of the center lug groove 25A towards the central area in the width direction. The sipe portion 25S formed as described above has a length Ls in the length direction of the center lug groove 25A ranging from 5% to 30% of a length Lt of the center lug groove 25A and is substantially centrally disposed in the center lug groove 25A. In other words, the lengths of the groove portions 25G located at either side of the sipe portion 25S are substantially the same.

Additionally, outer middle lug grooves 25Bo are the middle lug grooves 25B formed in an outer middle land portion 23Bo of the two middle land portions 23B located on the vehicle mounting direction outer side. The outer middle lug grooves 25Bo each include two ends connected to the two main grooves 22 adjacent to the outer middle land portion 23Bo. In other words, a plurality of the outer middle lug grooves 25Bo are arranged in the tire circumferential direction dividing the outer middle land portion 23Bo into a row of a plurality of block land portions in the tire circumferential direction. Each outer middle lug groove 25Bo communicates at respective ends to the center main groove 22A and the shoulder main groove 22B that define the outer middle land portion 23Bo.

Figure 7:
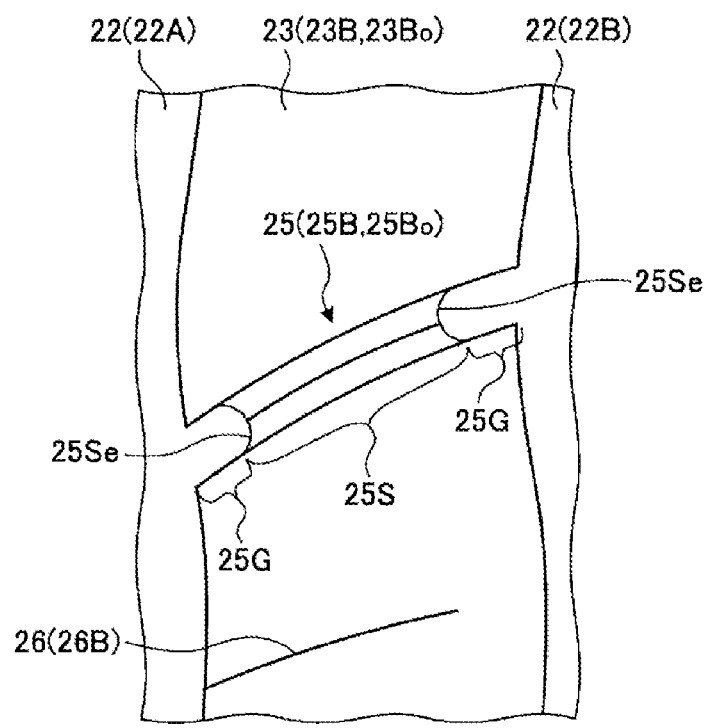
FIG. 7 is a detailed view of portion B of FIG. 2.

FIG. 7 is a detailed view of portion B of FIG. 2. The outer middle lug groove 25Bo, in a similar manner to that of the center lug groove 25A, includes the sipe portion 25S in a central region in the length direction of the outer middle lug groove 25Bo. The sipe portion 25S includes a sipe with a chamfered opening portion. The outer middle lug groove 25Bo also includes the groove portions 25G on either side of the sipe portion 25S in the length direction of the outer middle lug groove 25Bo. The sipe portion 25S and the groove portions 25G of the outer middle lug groove 25Bo, in a similar manner to that of the sipe portion 25S and the groove portions 25G of the center lug groove 25A, have the width Wg of the groove portions 25G and the width Ws of the sipe portion 25S to be substantially the same width. Also, the depth Dg of the groove portions 25G and the depth Ds of the sipe portion 25S are substantially the same (see FIGS. 5 and 6). The end portions 25Se of the sipe portion 25S of the outer middle lug groove 25Bo are also curved when viewed in a plan view, and the length Ls of the sipe portion 25S in the length direction of the outer middle lug groove 25Bo ranges from 5% to 30% of the length Lt of the outer middle lug groove 25Bo.

Figure 8:
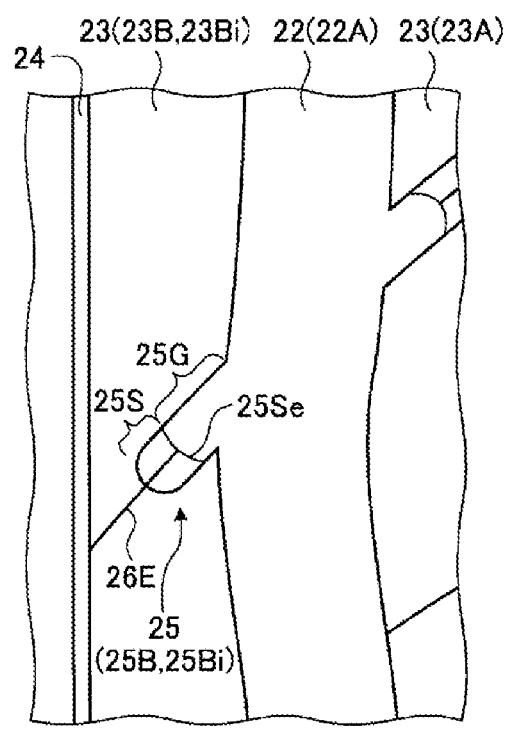
FIG. 8 is a detailed view of portion C of FIG. 2.

FIG. 8 is a detailed view of portion C of FIG. 2. An inner middle lug groove 25Bi, which is a middle lug groove 25B formed in the inner middle land portion 23Bi, includes one end that connects to the main groove 22 located inward in the tire lateral direction of the two main grooves 22 that define the inner middle land portion 23Bi and includes the other end that terminates within the inner middle land portion 23Bi. In other words, the inner middle lug groove 25Bi includes an inner end portion in the tire lateral direction that connects to the center main groove 22A and an outer end portion in the tire lateral direction that terminate within the inner middle land portion 23Bi. A plurality of the inner middle lug grooves 25Bi are arranged in the tire circumferential direction. Additionally, the inner middle lug groove 25Bi does not connect to the circumferential auxiliary groove 24 formed in the inner middle land portion 23Bi and is disposed inward of the circumferential auxiliary groove 24 in the tire lateral direction. In other words, the circumferential auxiliary groove 24 is disposed on the vehicle mounting direction inner side of the inner middle lug groove 25Bi. Thus, the inner middle land portion 23Bi is not divided into blocks by the lug grooves 25 and is formed as a rib-like land portion.

Additionally, the inner middle lug groove 25Bi includes the sipe portion 25S formed in a region from the end portion on the side where the end terminates within the inner middle land portion 23Bi to a predetermined position toward the other end portion. The groove portion 25G is formed in the remaining region. The sipe portion 25S and the groove portion 25G of the inner middle lug groove 25Bi have a similar configuration to the sipe portion 25S (see FIG. 6) and the groove portion 25G (see FIG. 5) of the center lug groove 25A. The sipe portion 25S is formed as the chamfered sipe 25Sn including the chamfers 25Sc. In other words, in a similar manner as the center lug groove 25A, in the inner middle lug groove 25Bi, the width Ws of the sipe portion 25S and the groove width Wg of the groove portion 25G are substantially the same, and the depth Ds of the sipe portion 25S and the depth Dg of the groove portion 25G are substantially the same. Also, the end portion 25Se of the sipe portion 25S is curved when viewed in a plan view.

Additionally, the communicating sipe 26E is formed in the inner middle land portion 23Bi between the end portion on the side where the inner middle lug groove 25Bi terminates within the inner middle land portion 23Bi and the circumferential auxiliary groove 24. The communicating sipe 26E connects the inner middle lug groove 25Bi and the circumferential auxiliary groove 24. The communicating sipe 26E communicates with the chamfered sipe 25Sn of the sipe portion 25S of the inner middle lug groove 25Bi.

The outer middle lug groove 25Bo provided in the outer middle land portion 23Bo and the center lug groove 25A provided in the center land portion 23A include ends that face one another on either side of the center main groove 22A between the outer middle land portion 23Bo and the center land portion 23A. Also, when viewed in a plan view, the outer middle lug groove 25Bo and the center lug groove 25A are one groove extending through the center main groove 22A. The center lug groove 25A provided in the center land portion 23A and the inner middle lug groove 25Bi provided in the inner middle land portion 23Bi include ends that face one another on either side of the center main groove 22A between the center land portion 23A and the inner middle land portion 23Bi. Also, when viewed in a plan view, the center lug groove 25A and the inner middle lug groove 25Bi are one groove extending through the center main groove 22A.

Thus, the outer middle lug groove 25Bo provided in the outer middle land portion 23Bo, the center lug groove 25A provided in the center land portion 23A, and the inner middle lug groove 25Bi provided in the inner middle land portion 23Bi are formed as one groove, a through lug groove 25E, extending through the center main grooves 22A. In other words, the outer middle lug groove 25Bo, the center lug groove 25A, and the inner middle lug groove 25Bi are disposed communicating with one another. Specifically, a plurality of the through lug grooves 25E are provided in the tire circumferential direction, each one extending in the tire lateral direction continuously through the center land portion 23A and the outer middle land portion 23Bo, and including one end that opens to the shoulder main groove 22B on the vehicle mounting direction outer side at the outer middle land portion 23Bo and the other end that extends through the center main groove 22A on the vehicle mounting direction inner side of the center land portion 23A and terminates within the inner middle land portion 23Bi without reaching the circumferential auxiliary groove 24.

Additionally, the through lug groove 25E extends in the tire lateral direction from an end portion on the side where the through lug groove 25E opens to the shoulder main groove 22B on the vehicle mounting direction outer side of the outer middle land portion 23Bo to an end portion on the side where the through lug groove 25E terminates within the inner middle land portion 23Bi, with a gentle curve in the tire circumferential direction. In other words, each of the lug grooves 25 including the outer middle lug groove 25Bo, the center lug groove 25A, and the inner middle lug groove 25Bi, which form the through lug groove 25E, extend in the tire lateral direction with a gentle curve in the tire circumferential direction, giving the through lug groove 25E an overall curved shape.

Figure 9:
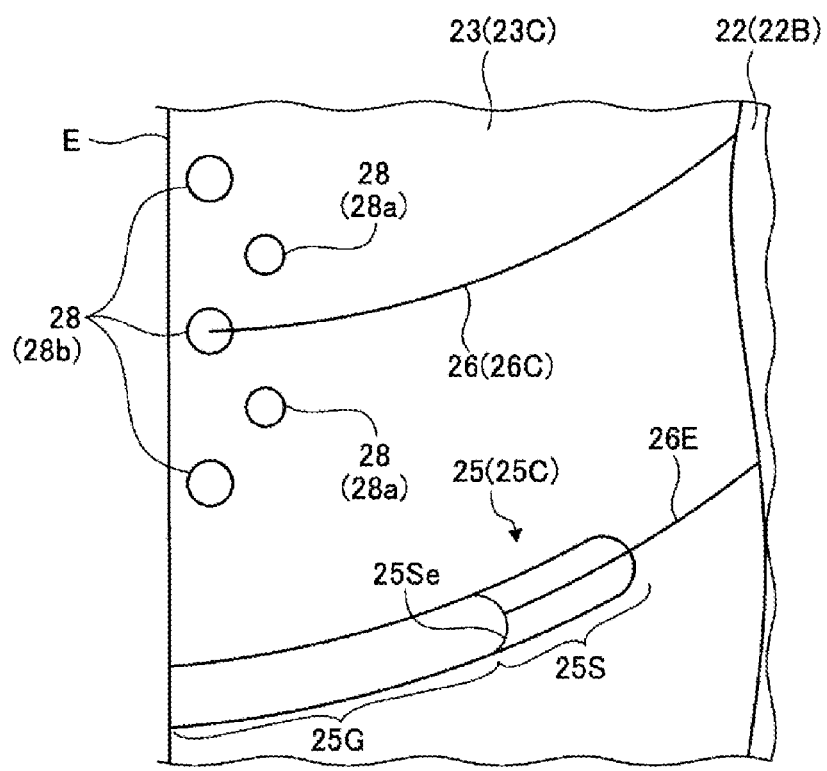
FIG. 9 is a detailed view of portion D of FIG. 2.
Figure 10:
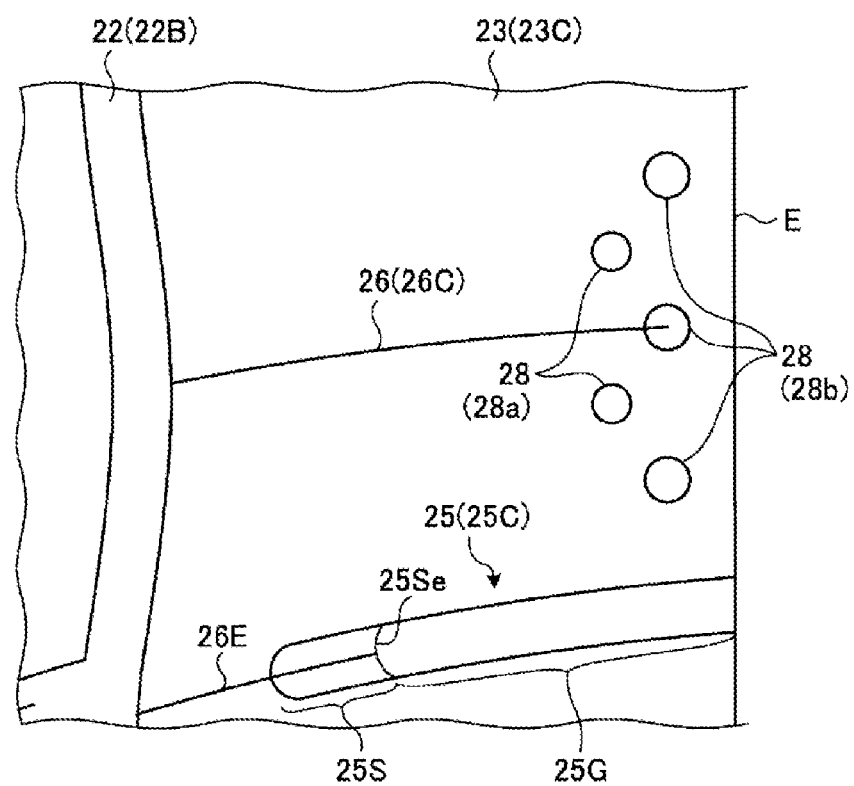
FIG. 10 is a detailed view of portion F of FIG. 2.

Each of the shoulder lug grooves 25C provided in each of the shoulder land portions 23C are plurally arranged side by side in the tire circumferential direction, each one extending in the tire lateral direction and being curved in the tire circumferential direction. FIG. 9 is a detailed view of portion D of FIG. 2. FIG. 10 is a detailed view of portion F of FIG. 2. The shoulder lug groove 25C includes one end that opens to a design end E, which is the outer end of the tread surface 21 of the tread portion 2 in the tire lateral direction, and the other end that terminates within the shoulder land portion 23C without reaching the shoulder main groove 22B inward of the shoulder land portion 23C in the tire lateral direction. In other words, the shoulder lug grooves 25C each include an inner end portion in the tire lateral direction that terminates within the shoulder land portion 23C. Thus, the shoulder land portions 23C are formed as rib-like land portions.

Additionally, the shoulder lug groove 25C includes the sipe portion 25S formed in a region from the end portion on the side where the end terminates within the shoulder land portion 23C to a predetermined position toward the other end portion. The groove portion 25G is formed in the remaining region. The sipe portion 25S and the groove portion 25G of the shoulder lug groove 25C have a similar configuration to the sipe portion 25S (see FIG. 6) and the groove portion 25G (see FIG. 5) of the center lug groove 25A. The sipe portion 25S is formed as the chamfered sipe 25Sn including the chamfers 25Sc. In other words, the shoulder lug groove 25C includes a predetermined region from the inner end portion in the tire lateral direction outward in the tire lateral direction that includes the chamfered sipe 25Sn with a chamfered opening portion. The plurality of the shoulder lug grooves 25C formed in the shoulder land portions 23C all include the chamfered sipe 25Sn. Additionally, in a similar manner as the center lug groove 25A, in the shoulder lug groove 25C, the width Ws of the sipe portion 25S and the groove width Wg of the groove portion 25G are substantially the same, and the depth Ds of the sipe portion 25S and the depth Dg of the groove portion 25G are substantially the same. Also, the end portion 25Se of the sipe portion 25S is curved when viewed in a plan view.

Additionally, the communicating sipe 26E is formed in the shoulder land portion 23C between the end portion on the side where the shoulder lug groove 25C terminates within the shoulder land portion 23C and the shoulder main groove 22B. The communicating sipe 26E connects the shoulder lug groove 25C and the shoulder main groove 22B. In other words, the communicating sipe 26E is formed connecting the inner end portion of the shoulder lug groove 25C in the tire lateral direction and the shoulder main groove 22B defining the inner end portion of the shoulder land portion 23C in the tire lateral direction. The communicating sipe 26E communicates with the chamfered sipe 25Sn of the sipe portion 25S of the shoulder lug groove 25C.

Note that for the shoulder lug groove 25C located on the vehicle mounting direction outer side and the shoulder lug groove 25C located on the vehicle mounting direction inner side, the position of the end portion that terminates within the shoulder land portion 23C of the shoulder lug groove 25C located on the vehicle mounting direction outer side is located further outward in the tire lateral direction than that of the shoulder lug groove 25C located on the vehicle mounting direction inner side. Specifically, for the shoulder land portion 23C on the vehicle mounting direction outer side and the shoulder land portion 23C on the vehicle mounting direction inner side, the combined length of the sipe portion 25S of the shoulder lug groove 25C and the communicating sipe 26E are substantially the same, however, the proportions of the sipe portion 25S and the communicating sipe 26E in the communicating sipe portion 25S and the communicating sipes 26E are different on the vehicle mounting direction outer side and the vehicle mounting direction inner side. In other words, the ratio of length of the sipe portion 25S to the combined length of the communicating sipe portion 25S and the communicating sipe 26E is lower on the vehicle mounting direction outer side than on the vehicle mounting direction inner side.

Here, the design end E refers to the outermost end of the tread portion 2 in the tire lateral direction located outward of the ground contact edge T in the tire lateral direction and the outermost end in the tire lateral direction of the tread portion 2 where grooves are formed. In FIG. 2, the design end E is illustrated as being continuous in the tire circumferential direction. In other words, when on a dry, flat road surface, the region of the tread portion 2 from the ground contact edge T to the design end E is a region that does not normally come into contact with the road surface.

Note that the shoulder lug grooves 25C provided in the shoulder land portions 23C each terminate within their respective shoulder land portion 23C and are separated from the through lug groove 25E described above. However, the shoulder lug grooves 25C provided in the shoulder land portion 23C on the vehicle mounting direction outer side are each formed such that the extended position of the end portion terminating within the shoulder land portions 23C is located at or near one end of the through lug groove 25E that is the end portion of the outer middle lug groove 25Bo on the side communicating with the shoulder main groove 22B. However, the shoulder lug grooves 25C provided in the shoulder land portion 23C on the vehicle mounting direction inner side are each formed such that the extended position of the end portion terminating within the shoulder land portions 23C is located at or near the other end of the through lug groove 25E that is the end portion of the inner middle lug groove 25Bi on the side terminating within the inner middle land portion 23Bi. In other words, each of the lug grooves 25, which include each of the shoulder lug grooves 25C provided in each of the shoulder land portions 23C and the through lug groove 25E (outer middle lug groove 25Bo, center lug groove 25A, inner middle lug groove 25Bi), are disposed between the outer ends (design ends E) of the tread portion 2 in the tire lateral direction, following smoothly on from one another on a curved line and straddling the land portions 23A, 23B, 23C.

Of the sipes 26, the center sipes 26A are formed in the center land portion 23A and extend in the tire lateral direction curving in the same direction as the curve direction of the center lug grooves 25A. The center sipes 26A each include one end communicating with the center main groove 22A that defines the end portion of the center land portion 23A on the vehicle mounting direction inner side, and the other end that terminates within the center land portion 23A without reaching the center main groove 22A that defines the end portion of the center land portion 23A on the vehicle mounting direction outer side. The center sipes 26A are disposed between pairs of the plurality of the center lug grooves 25A formed in the center land portion 23A. Each of the center lug grooves 25A and each of the center sipes 26A are alternately disposed plurally in the tire circumferential direction.

Additionally, the middle sipes 26B are formed in the middle land portion 23B and extend in the tire lateral direction. The middle sipes 26B each include one end communicating with the main groove 22 that defines the end portion of the middle land portion 23B on the vehicle mounting direction inner side, and the other end that terminates without reaching the main groove 22 that defines the end portion of the middle land portion 23B on the vehicle mounting direction outer side. Specifically, the middle sipes 26B provided in the outer middle land portion 23Bo extend in the tire lateral direction curving in the same direction as the curve direction of the outer middle lug grooves 25Bo. The end portion of the middle sipes 26B on the vehicle mounting direction outer side terminates within the middle land portion 23B without communicating with any other grooves. The middle sipes 26B provided in the outer middle land portion 23Bo are disposed between pairs of the plurality of the outer middle lug grooves 25Bo formed in the outer middle land portion 23Bo. The outer middle lug grooves 25Bo and the middle sipes 26B are each alternately disposed plurally in the tire circumferential direction.

Additionally, the middle sipes 26B provided in the inner middle land portion 23Bi are disposed between extension lines of pairs of inner middle lug grooves 25Bi adjacent in the tire circumferential direction and are inclined or curved in the same direction as the inclination direction of the inner middle lug grooves 25Bi in the tire circumferential direction. The middle sipes 26B of the inner middle land portion 23Bi are provided such that one end communicates with the shoulder main groove 22B of the inner middle land portion 23Bi and the other end communicates with the circumferential auxiliary groove 24 of the inner middle land portion 23Bi. Thus, the middle sipes 26B provided in the inner middle land portion 23Bi divide the portion of the middle land portion 23B between the shoulder main groove 22B and the circumferential auxiliary groove 24 into a plurality of row of blocks in the tire circumferential direction.

A plurality of the shoulder sipes 26C are provided in the shoulder land portion 23C, each one extending in the tire lateral direction and being curved in the same direction as the curved direction of the shoulder lug grooves 25C. The shoulder sipes 26C provided in the shoulder land portions 23C are disposed between pairs of shoulder lug grooves 25C adjacent in the tire circumferential direction. The shoulder lug grooves 25C and the shoulder sipes 26C are alternately disposed in the tire circumferential direction. The shoulder sipes 26C each include one end that communicates with the shoulder main groove 22B that defines the inner end portion of the shoulder land portion 23C in the tire lateral direction and extend beyond the ground contact edge T and terminate within the shoulder land portion 23C at or near the each of the outer end (design end E) of the tread portion 2 in the tire lateral direction.

Note that the shoulder land portions 23C are provided with a recessed portion 28 at or near the each of the outer ends (design ends E) of the tread portion 2 in the tire lateral direction. The recessed portion 28 is formed in a circular dimple shape with a diameter ranging from 0.5 mm to 2.0 mm and a depth ranging from 0.2 mm to 1.0 mm. The recessed portions 28 are formed in two rows in the tire lateral direction between a pair of shoulder lug grooves 25C adjacent in the tire circumferential direction, as a laterally inner row 28a of two recessed portions 28 in the tire circumferential direction and a laterally outer row 28b of three recessed portions 28 in the tire circumferential direction. Additionally, the recessed portions 28 of the laterally outer row 28b have a larger diameter than those of the recessed portions 28 of the laterally inner row 28a. Furthermore, each of the shoulder sipes 26C provided in each of the shoulder land portion 23C are provided such that the outer end portion in the tire lateral direction terminates at one of the recessed portions 28. In the present embodiment, the shoulder sipes 26C terminate at the recessed portion 28 centrally located in the tire circumferential direction of the laterally outer row 28b.

The tread surface 21 formed with the plurality of grooves and the plurality of sipes as described above has an asymmetrical tread pattern in the tire lateral direction. The difference in the groove area ratio between the two sides on either side of the tire equatorial plane CL in the tire lateral direction is 2% or less. Here, groove area ratio is defined as a percentage representing: groove area/(groove area+ground contact area). Groove area is the total opening area of all of the grooves in the contact patch (ground contact region). Additionally, the groove area and the ground contact area are measured when the pneumatic tire 1 is mounted on a regular rim, inflated to the regular internal pressure, and loaded with 70% of the regular load.

When such a pneumatic tire 1 is mounted on a vehicle and the vehicle is driven, the pneumatic tire 1 rotates while the tread surface 21 of the tread surface 21 located at the bottom comes into contact with the road surface. When the vehicle mounted with the pneumatic tire 1 is driven on a dry road surface, driving force and braking force is transmitted to the road surface and turning force is generated mainly through the friction force generated between the tread surface 21 and the road surface. Additionally, when the vehicle is driven on a wet road surface, the water between the tread surface 21 and the road surface enters into the main grooves 22 and the lug grooves 25 and these grooves discharge the water between the tread surface 21 and the road surface. This allows the tread surface 21 to more readily come into contact with the road surface, which, via the friction force between the tread surface 21 and the road surface, enables the vehicle to be driven.

However, prioritizing drainage properties and providing many grooves can result in a decrease in the rigidity of the land portions 23. This can reduce wear resistance. Accordingly, in the pneumatic tire 1 according to the present embodiment, the center lug grooves 25A, with both ends connecting to the two main grooves 22 that define the center land portion 23A, and the outer middle lug grooves 25Bo, with both ends connecting to the two main grooves 22 adjacent to the outer middle land portion 23Bo, include the sipe portions 25S in a central region in the length direction. The sipe portions 25S each including a sipe with a chamfered opening portion.

In this way, the center lug grooves 25A and the outer middle lug grooves 25Bo can ensure drainage properties, and when the region of the tread surface 21 where the center lug grooves 25A and the outer middle lug grooves 25Bo are formed comes into contact with the ground, the rigidity of the center land portion 23A and the outer middle land portion 23Bo can be ensured by the sipe walls 25Sw of the sipe portions 25S coming into contact with one another. In this way, the wear resistance of the center land portion 23A and the outer middle land portion 23Bo, which are susceptible to being subject to large loads when the vehicle is traveling, can be ensured. Furthermore, the outer middle lug groove 25Bo, the center lug groove 25A, and the inner middle lug groove 25Bi are disposed communicating with one another, allowing water to flow between the lug grooves 25 each other. This increases drainage properties. As a result of the foregoing, wear resistance performance can be improved while maintaining wet performance.

Additionally, when the vehicle travels straight in normal driving conditions, the region of the tread surface 21 on the vehicle mounting direction inner side is relatively susceptible to being subjected to loads. However, in the inner middle land portion 23Bi, the circumferential auxiliary groove 24 is formed in on the vehicle mounting direction inner side from the inner middle lug groove 25Bi. This circumferential auxiliary groove 24 allows the drainage properties of the region susceptible to being subjected to loads to be ensured. As a result of the foregoing, wear resistance performance and wet performance can be improved.

The main grooves 22 include four main grooves 22 disposed side by side in the tire lateral direction that extend in the tire circumferential direction with a constant groove width and an oscillation in the tire lateral direction. The main grooves 22 can deal with water in a larger region than grooves with a straight shape. Additionally, the main grooves 22 do not include a portion with a narrow groove width. This prevents the flow of water from being blocked due to a narrow groove width, resulting in further improved drainage properties. Furthermore, the main grooves 22 oscillate without a variation in groove width. This allows a difference in rigidity in the regions of the land portions 23 around the regions where the main grooves 22 are formed to be suppressed and uneven wear caused by a difference in rigidity to be suppressed. As a result of the foregoing, wear resistance performance and wet performance can be further reliably improved.

The shoulder lug grooves 25C are formed in the shoulder land portions 23C and each include an inner end portion in the tire lateral direction that terminates within the shoulder land portion 23C. This configuration allows the drainage properties of the outer region in the tire lateral direction to be ensured and the rigidity of the shoulder land portions 23C to be ensured. As a result of the foregoing, wear resistance performance can be improved while maintaining wet performance, further reliably.

Additionally, the communicating sipes 26E are formed in the shoulder land portions 23C. Each communicating sipe 26E communicates with the inner end portion of the shoulder lug groove 25C in the tire lateral direction and the shoulder main groove 22B. These communicating sipes 26E ensure the flow of water between the shoulder lug grooves 25C and the shoulder main grooves 22B. Also, because the wall surfaces of the communicating sipes 26E come into contact with one another when the region around the shoulder lug grooves 25C is subjected to a load, the rigidity of the shoulder land portions 23C can be ensured. As a result of the foregoing, wear resistance performance can be improved while maintaining wet performance, further reliably.

Additionally, the shoulder lug grooves 25C each include a predetermined region from the inner end portion in the tire lateral direction outward in the tire lateral direction that includes the chamfered sipe 25Sn. Thus, sudden changes in the difference in rigidity can be suppressed even in a configuration in which the communicating sipes 26E connect the shoulder lug grooves 25C and the shoulder main grooves 22B. Specifically, the shoulder lug grooves 25C each include the chamfered sipe 25Sn at a position towards the end portion on the side that communicates with the communicating sipe 26E. Thus, the rigidity at the position at or near the end portion on the side that communicates with the communicating sipe 26E can be increased compared to a configuration in which only the groove portion 25G is formed in the shoulder lug grooves 25C. In other words, by disposing the chamfered sipe 25Sn in the shoulder lug groove 25C, the rigidity of the shoulder land portion 23C can be gradually varied from the portion of the shoulder lug groove 25C where the groove portion 25G is formed to the portion where the communicating sipe 26E is formed. This allows uneven wear caused by a sudden difference in rigidity to be suppressed. As a result of the foregoing, wear resistance performance can be improved while maintaining wet performance, further reliably.

The plurality of shoulder lug grooves 25C provided in the shoulder land portions 23C all include the chamfered sipe 25Sn. This allows the overall uneven wear of the shoulder land portions 23C to be further reliably suppressed. As a result of the foregoing, wear resistance performance can be improved while maintaining wet performance, further reliably.

The shoulder lug grooves 25C and the shoulder sipes 26C are alternately disposed in the tire circumferential direction in the shoulder land portions 23C. This allows a decrease in rigidity of the shoulder land portions 23C caused by disposed many lug grooves 25 to be suppressed more than a configuration in which many lug grooves 25 are disposed in the shoulder land portions 23C to improve drainage properties. As a result of the foregoing, wear resistance performance can be improved while maintaining wet performance, further reliably.

The recessed portion 28 is formed at the shoulder land portion 23C in the tire lateral direction. This allows the surface area of the tread surface 21 to be increased and the surface of the tread surface 21 to be brought closer to the internal structures such as the belt layer 7 at the recessed portion 28. This increases the heat dissipation of heat generated when the tire rolls. The shoulder sipe 26C includes an outer end portion in the tire lateral direction that terminates at the recessed portion 28. This allows a sudden change in rigidity at or near the end portion of the shoulder sipe 26C to be suppressed and uneven wear to be suppressed. As a result, wear resistance performance can be further reliably improved and the durability of the pneumatic tire 1 can be improved.

The recessed portions 28 are disposed in two rows in the tire lateral direction, with two recessed portions 28 formed in the tire circumferential direction in the laterally inner two 28a and three recessed portions 28 formed in the tire circumferential direction in the laterally outer row 28b. The recessed portions 28 in the laterally outer row 28b have a larger diameter than the recessed portions 28 in the laterally inner two 28a. Thus, the appearance of the outer end of the tread portion 2 in the tire lateral direction can be improved. As a result, the appearance of the pneumatic tire 1 can be improved. Note that the portion where the recessed portions 28 are formed is a portion outward from the ground contact edges T in the tire lateral direction that normally does not come into contact with a dry road surface, and is thus a portion that does not affect the driving of the vehicle.

The middle sipe 26B includes an end that communicates with the main groove 22 on the vehicle mounting direction inner side of the middle land portion 23B and the other end that terminates within the middle land portion 23B, and the center sipe 26A includes an end that communicates with the main groove 22 on the vehicle mounting direction inner side of the center land portion 23A and the other end that terminates within the center land portion 23A. Thus, in the center land portion 23A and the middle land portions 23B, the groove area at positions on the vehicle mounting direction inner side can be increased and the rigidity of the land portions 23 at position on the vehicle mounting direction outer side can be ensured. Accordingly, drainage properties when the vehicle is traveling straight and the rigidity of the land portions 23 in the region on the vehicle mounting direction outer side when the vehicle is turning can be ensured. As a result, the steering stability of the vehicle can be ensured both in wet and dry road surface conditions.

In the tread surface 21, the difference in the groove area ratio between the two sides of the tire equatorial plane CL in the tire lateral direction is 2% or less. Thus, in forming the tread pattern with a pattern that provides wear resistance performance and wet performance in a compatible manner, a deviation both in drainage properties of the tread surface 21 and rigidity of the land portions 23 can be suppressed. As a result, wear resistance performance can be improved while maintaining wet performance, further reliably, without producing a deviation in performance between the two sides of the tire equatorial plane CL in the tire lateral direction.

Of the main grooves 22, the center main grooves 22A centrally positioned in the tire lateral direction have the groove width W1 which is greater than that of the shoulder main grooves 22B. Thus, the drainage properties can be increased in the region at or near the tire equatorial plane CL which increase in ground contact length when the vehicle travels straight. As a result, wet performance can be effectively improved.

Additionally, of the shoulder lug grooves 25C located on both sides in the tire lateral direction, the shoulder lug grooves 25C on the vehicle mounting direction inner side has a greater ratio of the sipe portion 25S length to the combined length of the communicating sipe portion 25S and communicating sipe 26E than the shoulder lug grooves 25C on the vehicle mounting direction outer side. Thus, the shoulder land portion 23C on the vehicle mounting direction inner side can be given higher drainage properties than the shoulder land portion 23C on the vehicle mounting direction outer side. This allows drainage properties of the region on the vehicle mounting direction inner side, which greatly contributes to the steering stability of the vehicle in terms of drainage, to be increased. As a result, wet performance can be effectively improved.

Additionally, each of the lug grooves 25 that include the sipe portions 25S and the groove portions 25G include the end portion 25Se of the sipe portion 25S which is curved. This allows a gentle change in the rigidity at the boundary portion of the sipe portion 25S and the groove portion 25G. As a result, uneven wear caused by a sudden change in rigidity can be suppressed and wear resistance performance can be more reliably improved.

Note that in the pneumatic tire 1 according to the embodiments described above, the widths Wg, Ws and the depths Dg, Ds of the groove portion 25G and the sipe portion 25S that configure one lug groove 25 have substantially the same size. However, the width Wg of the groove portion 25G and the width Ws of the sipe portion 25S, and the depth Dg of the groove portion 25G and the depth Ds of the sipe portion 25S may be different from one another. The widths Wg, Ws and the depths Dg, Ds of the groove portion 25G and the sipe portion 25S are preferably appropriately set in consideration of drainage properties and the rigidity of the land portions 23.

Examples

FIGS. 11A to 11D are tables showing the results of performance tests of pneumatic tires. In relation to the pneumatic tire 1 described above, performance evaluation tests conducted on a pneumatic tire according to a conventional example, pneumatic tires 1 according to embodiments of the present technology, and pneumatic tires according to comparative examples for comparison with the pneumatic tires 1 according to embodiments of the present technology will be described below. The performance evaluation tests were conducted for wear resistance performance, i.e., the resistance to wear of the tread surface 21, and wet braking, i.e., braking performance on wet road surfaces.

In the performance evaluation tests, the pneumatic tires 1 having a nominal size specified by JATMA of 205/55R16 were mounted on rim wheels of JATMA standard rims having a size of 16×6.5 J, adjusted to an internal pressure of 200 kPa, and mounted to a front wheel drive test vehicle having an engine displacement of 1600 cc, and then test runs were done. For the evaluation methods of the tests for wear resistance performance, the test vehicle was driven on a test course with a dry road surface and the distance traveled until the tread surface 21 completely worn, i.e., the distance traveled until the wear indicator provided on the main groove 22 showed, was measured. The measure distance traveled was then expressed as an index value and evaluated. For wear resistance performance, the values are expressed as index values with the conventional example described below being assigned a value of 100. Larger index values indicate superior wear resistance performance. For wet braking, the distance traveled after braking until stopping from an initial speed of 100 km/h on a wet road surface with a water depth of 1 mm was measured. The reciprocal of the measurement value was then expressed as an index value and evaluated. For wet braking, the values are expressed as index values with the conventional example described below being assigned a value of 100. Larger index values indicate superior wet braking.

The evaluation tests were conducted on 16 different pneumatic tires including a pneumatic tire according to Conventional Example, which is an example of a known pneumatic tire 1, Examples 1 to 13, which are pneumatic tires 1 according to embodiments of the present technology, and Comparative Examples 1 and 2, which are pneumatic tires for comparison to pneumatic tires 1 according to embodiments of the present technology. Of these pneumatic tires 1, in the pneumatic tire of Conventional Example, the lug grooves of the center land portion and lug grooves of the outer middle land portion do not include the sipe portion and only include the groove portion. In the pneumatic tires of Comparative Examples 1 and 2, the lug grooves of the center land portion and the lug grooves of the outer middle land portion include only the sipe portion, or the lug grooves of the center land portion and the lug grooves of the outer middle land portion include ends portions that do not communicate with a main groove and each one of the ends terminate within the land portion.

In Examples 1 to 13, which are pneumatic tires 1 according to examples of the present technology, all of the lug grooves of the center land portion and the lug grooves of the outer middle land portion include ends that communicate with the main grooves 22 and include the sipe portion 25S and the groove portion 25G. In the pneumatic tires 1 of Examples 1 to 13, the shape of the main grooves 22, the presence of the circumferential auxiliary groove 24, communicating sipe 26E, shoulder sipe 26C, and recessed portion 28, the configuration of the inner middle lug groove 25Bi, shoulder lug groove 25C, center sipe 26A, and middle sipe 26B, and difference in groove area ratio between the two sides in the tire lateral direction are varied.

As seen from the results of the evaluation tests using the pneumatic tires 1 indicated in FIGS. 11A to 11D, compared to the Conventional Example and Comparative Examples 1 and 2, the pneumatic tires 1 of Examples 1 to 13 can provide improved wear resistance performance without a decrease in wet braking performance. In other words, the pneumatic tires 1 according to Examples 1 to 13 can provide improved wear resistance performance while maintaining wet performance.

The invention claimed is:

1. A pneumatic tire with a designated mounting direction with respect to a vehicle, the pneumatic tire comprising:
    a plurality of main grooves formed in a tread surface extending in a tire circumferential direction;
    a center land portion defined on both sides in a tire lateral direction by the main grooves;
    a middle land portion located on either side of the center land portion in the tire lateral direction, the middle land portion being defined by the main groove defining the center land portion and the main groove outwardly adjacent in the tire lateral direction to the main groove defining the center land portion;
    a center lug groove extending in the tire lateral direction formed in the center land portion, the center lug groove including ends on both sides connecting to two of the main grooves defining the center land portion;
    an outer middle lug groove extending in the tire lateral direction formed in an outer middle land portion, of the two middle land portions, located on a vehicle mounting direction outer side, the outer middle lug groove including ends on both sides connecting to two of the main grooves adjacent to the outer middle land portion; and
    an inner middle lug groove extending in the tire lateral direction formed in an inner middle land portion, of the two middle land portions, located on a vehicle mounting direction inner side, the inner middle lug groove including an end connecting to the main groove located toward the vehicle mounting direction outer side of the two main groves defining the inner middle land portion and the other end terminating within the inner middle land portion, wherein
    the center lug groove and the outer middle lug groove each includes a sipe portion at a central region in a length direction, the sipe portion including a sipe with a chamfered opening portion, the chamfered opening portion being formed in a groove bottom of the center lug groove and the outer middle lug groove, respectively, such that, along a length of the sipe, a sipe width decreases from the chamfered opening portion formed in the groove bottom toward a sipe bottom radially inward of the groove bottom,
    the inner middle land portion comprises a straight, circumferential auxiliary groove extending without intersection by lug grooves,
    a sipe depth of the sipe, a groove depth of the center lug groove, and a groove depth of the middle lug groove being the same, and
    the outer middle lug groove, the center lug groove, and the inner middle lug groove are disposed in a communicating manner.

2. The pneumatic tire according to claim 1, wherein
    the middle land portion includes a middle sipe extending in the tire lateral direction,
    the center land portion includes a center sipe extending in the tire lateral direction,
    the middle sipe includes an end communicating with the main groove defining an inner end portion of the middle land portion on the vehicle mounting direction inner side and the other end terminating within the middle land portion, and
    the center sipe includes an end communicating with the main groove defining an inner end portion of the center land portion on the vehicle mounting direction inner side and the other end terminating within the center land portion.

3. The pneumatic tire according to claim 1, wherein
    the tread surface includes a tread pattern with an asymmetrical pattern in the tire lateral direction, and
    a difference in groove area ratio between two sides of a tire equatorial plane in the tire lateral direction is 2% or less.

4. The pneumatic tire according to claim 1, wherein
    the circumferential auxiliary groove extends in the tire circumferential direction, and
    the inner middle lug groove is disposed inward from the circumferential auxiliary groove in the tire lateral direction.

5. The pneumatic tire according to claim 4, wherein
    the main grooves are disposed four side by side in the tire lateral direction, and
    shoulder land portions are located outwardly adjacent to the middle land portions in the tire lateral direction interposing the main grooves,
    the four main grooves extending in the tire circumferential direction with a constant groove width, oscillating in the tire lateral direction.

6. The pneumatic tire according to claim 5, wherein
    the shoulder land portions each include a shoulder lug groove extending in the tire lateral direction, and
    the shoulder lug groove includes an inner end portion in the tire lateral direction terminating within the shoulder land portion.

7. The pneumatic tire according to claim 6, wherein
the shoulder land portions each include a communicating sipe, the communicating sipe connects an inner end portion of the shoulder lug groove in the tire lateral direction and the main groove defining an inner end portion of the shoulder land portion in the tire lateral direction.

8. The pneumatic tire according to claim 7, wherein
the shoulder lug groove includes a predetermined region, from an inner end portion in the tire lateral direction outward in the tire lateral direction, configured with a chamfered sipe with a chamfered opening portion.

9. The pneumatic tire according to claim 8, wherein
the shoulder land portion includes a plurality of the shoulder lug grooves, and
the plurality of shoulder lug grooves all include the chamfered sipe.

10. The pneumatic tire according to claim 9, wherein
the shoulder land portion includes a shoulder sipe extending in the tire lateral direction and communicating with the main groove defining an inner end portion of the shoulder land portion in the tire lateral direction, and
the shoulder lug groove and the shoulder sipe are alternately disposed in the tire circumferential direction.

11. The pneumatic tire according to claim 10, wherein
the shoulder land portion includes a recessed portion at an outer end of the shoulder land portion in the tire lateral direction, and
the shoulder sipe includes an outer end portion in the tire lateral direction terminating at the recessed portion.

12. The pneumatic tire according to claim 11, wherein
the shoulder land portion includes a recessed portion at an outer end of the shoulder land portion in the tire lateral direction,
the recessed portions are disposed in two rows in the tire lateral direction,
a laterally inner row including two recessed portions are arranged in the tire circumferential direction,
a laterally outer row including three recessed portions are arranged in the tire circumferential direction, and
the laterally outer row has a larger diameter than the laterally inner row.

13. The pneumatic tire according to claim 1, wherein
the main grooves are disposed four side by side in the tire lateral direction, and
shoulder land portions are located outwardly adjacent to the middle land portions in the tire lateral direction interposing the main grooves,
the four main grooves extending in the tire circumferential direction with a constant groove width, oscillating in the tire lateral direction.

14. The pneumatic tire according to claim 13, wherein
the shoulder land portion includes a recessed portion at an outer end of the shoulder land portion in the tire lateral direction,
the recessed portions are disposed in two rows in the tire lateral direction,
a laterally inner row including two recessed portions are arranged in the tire circumferential direction,
a laterally outer row including three recessed portions are arranged in the tire circumferential direction, and
the laterally outer row has a larger diameter than the laterally inner row.

15. The pneumatic tire according to claim 13, wherein
the shoulder land portions each include a shoulder lug groove extending in the tire lateral direction, and
the shoulder lug groove includes an inner end portion in the tire lateral direction terminating within the shoulder land portion.

16. The pneumatic tire according to claim 15, wherein
the shoulder land portion includes a shoulder sipe extending in the tire lateral direction and communicating with the main groove defining an inner end portion of the shoulder land portion in the tire lateral direction, and
the shoulder lug groove and the shoulder sipe are alternately disposed in the tire circumferential direction.

17. The pneumatic tire according to claim 16, wherein
the shoulder land portion includes a recessed portion at an outer end of the shoulder land portion in the tire lateral direction, and
the shoulder sipe includes an outer end portion in the tire lateral direction terminating at the recessed portion.

18. The pneumatic tire according to claim 15, wherein
the shoulder land portions each include a communicating sipe, the communicating sipe connects an inner end portion of the shoulder lug groove in the tire lateral direction and the main groove defining an inner end portion of the shoulder land portion in the tire lateral direction.

19. The pneumatic tire according to claim 18, wherein
the shoulder lug groove includes a predetermined region, from an inner end portion in the tire lateral direction outward in the tire lateral direction, configured with a chamfered sipe with a chamfered opening portion.

20. The pneumatic tire according to claim 19, wherein
the shoulder land portion includes a plurality of the shoulder lug grooves, and
the plurality of shoulder lug grooves all include the chamfered sipe.

* * * * *